United States Patent Office 3,595,663
Patented July 27, 1971

3,595,663
GELATIN EMULSION HARDENING COMPOSITION
Salvatore Emmi, Binghamton, N.Y., assignor to
GAF Corporation, New York, N.Y.
No Drawing. Filed July 15, 1968, Ser. No. 744,632
Int. Cl. G03c 1/30
U.S. Cl. 96—111                                    4 Claims

ABSTRACT OF THE DISCLOSURE

A gelatin emulsion hardener comprising a water soluble condensation product prepared by condensing acrolein and formaldehyde under alkaline conditions, and having the general formula:

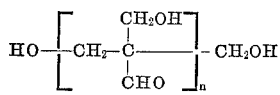

wherein $n$ is an integer from 1–5, inclusive. Delayed hardening is obtained by the use of the bisulfite adduct of the addition product.

---

The present invention relates to a process of hardening gelatin compositions and such gelatin compositions so hardened; more particularly, the present invention relates to the hardening of photographic gelatin layers and such photographic gelatin layers so hardened wherein such hardening is obtained by the utilization of a water-soluble condensation product of acrolein and formaldehyde, or a bisulfite adduct of such condensation product.

Various classes of materials have been previously proposed as hardening agents for gelatin compositions, and particularly photographic layers of gelatin and similar proteins. Such classes of compounds which have been employed for this purpose include, for example: metal salts, such as chromium, aluminum and zirconium salts; aldehydes and halogenous aldehyde compounds, such as formaldehyde, dialdehydes and mucochloric acid; 1,2- and 1,4-diketones, such as cyclohexane-1,2-dione; quinones; chlorides of dibasic organic acids; dianhydrides of tetracarboxylic acids; compounds with several reactive vinyl groups, such as vinyl sulphones, acrylamides; compounds with at least 2 heterocyclic rings which can easily be split off, such as ethylene oxide and ethylene imine; polyfunctional methane-sulphonic acid esters.

Of the above-mentioned classes of materials that have been generally employed, probably the most widely mentioned material is formaldehyde. In this respect, formaldehyde is extremely active as a hardening agent for gelatin. However, formaldehyde often exhibits undesirable photographic properties and in some situations may even be toxic and have a detrimental effect upon certain photographic developing agents. Accordingly, it has been found desirable to replace formaldehyde with other effective hardening agents.

Thus, while various other aldehydes and dialdehydes have been employed as hardening agents for gelatin, while eliminating some of the inherent deficiencies and disadvantages associated with the employment of formaldehyde, such hardeners have not proved to be entirely suitable in developer formulations employing a pH higher than 10, especially in high temperature and high speed developing processes.

Similarly, various proposals for the production and utilization of hardening agents for photographic gelatin layers have included the use of high molecular weight polymeric materials, e.g. homopolymers and copolymers of acrolein, for example, as set forth in German patent specification 1,083,051. However, since the high polymer hardening agents cannot penetrate into the gelatin or similar layer, the hardening of the gelatin or similar material can only take place on the surface. Accordingly, this is disadvantageous both with respect to the fact that a homogenous hardening cannot be achieved and for the fact that a great concentration of hardener must be employed in order to obtain any satisfactory degree of hardening at all. While attempts to control such disadvantages of the use of high molecular weight polymers as hardening agents for gelatin have been proposed, e.g. U.S. Pat. 3,226,234, such proposals have involved complicated systems involving critical control of pH values so as to obtain an increased penetration of the hardening agent. Again, however, the hardening effect achieved by the utilization of such high molecular weight materials has not been sufficient when utilized in high temperature and high speed development processes.

Accordingly, it has long been a desire of the industry to provide a gelatin hardener and a method of employing the same which would eliminate the inherent deficiencies and disadvantages of previously employed materials. This has been accomplished in accordance with the present invention.

Thus, in accordance with the present invention, it has now been discovered that certain low molecular weight, water-soluble condensation products of formaldehyde and acrolein and the bisulfite adducts thereof have exceptional ability in the hardening of gelatin, particularly photographic gelatin emulsions and layers. In this respect, it has been discovered in accordance with the present invention that certain low molecular weight water-soluble condensation products of formaldehyde and acrolein are superior to conventional gelatin hardeners, especially in high temperature and high speed developmental processes.

Accordingly, it is a principal object of the present invention to provide gelatin compositions containing novel gelatin hardeners and processes of hardening such gelatin compositions, which compositions and processes have eliminated the inherent deficiencies and disadvantages of the prior art.

A further object of the present invention is to provide a method of hardening gelatin, e.g. a gelatin containing photographic emulsion layer wherein such hardening is accomplished by the utilization of a water-soluble condensation product of acrolein and formaldehyde.

Yet a further object of the present invention is to provide such a method of hardening a gelatin containing photographic emulsion wherein a bisulfite derivative of such water-soluble condensation product of acrolein and formaldehdye is employed.

Yet a further object of the present invention is to provide a gelatin composition which contains as a hardener a water-soluble condensation product of acrolein and formaldehyde or a bisulfite derivative or adduct thereof.

Still further objects and advantages of the composition and process of the present invention will become more apparent from the following more detailed description thereof.

The hardening of the gelatin photographic emulsion layers in accordance with the present invention is achieved by the utilization of a water-soluble low molecular weight condensation product of acrolein and formaldehyde. Such low molecular weight condensation products of acrolein and formaldehyde are known in the art, such condensation products generally being prepared by condensing acrolein and formaldehyde in the presence of a small percentage, i.e. less than 5% by weight, of a basic catalyst, the reactants generally being employed in a mol ratio of one mol of acrolein to one to 6 mols of formaldehyde. The preparation of such condensation products is more fully set forth in U.S. Pats. 2,771,337 and 3,346,324 which respectively illustrate the use of such water-soluble, low molecular weight condensation products in the treatment of textile fabrics and the tanning of leather.

Such condensation products of acrolein and formaldehyde obtained under alkaline conditions in the presence of a small amount of a basic catalyst are sold commercially as "X–2 chemical reactor" and "X–2–S chemical reactor" by Dan River Mills. Such products are fully described in U.S. Pat. 3,346,324.

Generally, the water-soluble, low molecular weight condensation products of acrolein and formaldehyde can be represented by the following general formula:

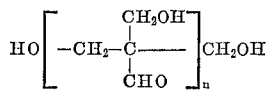

wherein $n$ is an integer from 1 to 5, inclusive.

Of course, the condensation product of acrolein and formaldehyde in accordance with the present invention need not necessarily be present as a single material, and in fact, the condensation of formaldehyde and acrolein under alkaline conditions and in the presence of a small amount of a basic catalyst generally produces products comprising mixtures of condensation products, such products falling within the generic formula set forth above.

In addition, the water-soluble condensation product of acrolein and formaldehyde employed in accordance with the present invention can also be employed in the form of its bisulfite adduct or derivative. Such bisulfite derivative is produced by reacting a solution of the water-soluble condensation product with an alkali metal bisulfite, e.g. sodium bisulfite, generally employed in an excess amount. The bisulfite adduct or derivative of the water-soluble low molecular weight condensation product of acrolein and formaldehyde is capable of exciting a delayed action hardening effect on the gelatin photographic emulsion layers.

The water-soluble, low molecular weight condensation products of acrolein and formaldehyde are utilized in accordance with the present invention in the hardening of a gelatin composition, e.g. a photographic gelatin emulsion layer by incorporating the condensation product in such gelatin layer either by direct addition thereto or by immersion of the gelatin composition into a solution of the water-soluble condensation product. When added to the gelatin emulsion layer, the condensation products of the present invention are generally employed in that amount effective to produce the desired hardening of the gelatin. Generally, such an amount varies from about 1% to about 10% by weight based on the gelatin, slightly lesser or greater amounts being applicable where desired for particular purposes. When an aqueous solution of the condensation product is employed to provide the necessary hardener for the gelatin emulsion layer, generally, the amount of hardener present in such aqueous solution is that amount necessary to provide the desired degree of hardening when applied to the gelatin layer. Here again, aqueous solutions containing from about 1% to about 10% by weight of the water-soluble condensation products have been found applicable to provide the necessary concentration of the hardener in the gelatin layer. Here again, however, where desired for particular purposes aqueous solutions containing slightly higher or lower concentrations of the water-soluble condensation product can be advantageously employed. It is noted again, however that the hardener of the present invention is employed in that amount necessary and effective to provide the desired degree of hardening of the gelatin emulsion layer.

The present invention is applicable to the hardening of any and all conventional gelatin-silver halide photographic emulsion layers. In this respect, the process and composition of the present invention is applicable to gelatino-silver bromide, gelatino-silver iodide, gelatino-silver chloride, gelatino-silver iodide-silver bromide, gelatino-silver bromide-silver chloride, etc. Thus, all such conventional silver halide photographic emulsions containing gelatin can be hardened in accordance with the process of the present invention.

As set forth above, the present invention is particularly suitable in high temperature and high speed developing processes wherein the water-soluble condensation product is employed in a conventional developer composition. Thus, any and all conventional developing compositions generally applicable for the development of gelatin-silver halide emulsion layers can have incorporated therein the water-soluble condensation product of acrolein and formaldehyde in an amount effective to provide the desired and necessary hardening of the gelatin.

The present invention will now be described by reference to the following specific examples. Such examples are presented for purposes of illustration only and the present invention is in no way to be deemed as limited thereto.

EXAMPLE I

An 8% gelatin solution was coated on a transparent film-base and cut into small strips. One strip was immersed in a simulated developer solution (pH 10), containing 40 ml./liter of the "X–2 Chemical Reactor" (a water soluble condensation product of acrolein and formaldehyde available from Dan River Mills), for 15 seconds. The thus treated filmstrip would not melt or reticulate even when held in boiling water for several minutes. A control sample treated in a similar developer bath without any hardener melted at 38° C.

EXAMPLE II

Strips of film prepared by coating a typical X-ray gelatin-silver bromide emulsion on acetate base were processed in developer solution designed for high temperature and rapid processing. For the purpose of this test the pH of the developer was adjusted to 10.5. Under these conditions, the developer containing the "X–2 Chemical Reactor" showed improved stability against decomposition and improved fog characteristics in comparison with other conventional hardeners.

The abrasion resistance of the gelatin-silver halide emulsion was tested and compared to a control wherein no hardener was added and to a similar composition wherein glutaraldehyde, a conventionally employed gelatin hardener, was utilized. The following results were obtained:

| | Abrasion resistance in grams |
|---|---|
| Control (no hardener) | 15–16 |
| Glutaraldehyde (20 ml. of 25% soln./liter) | 200 |
| "X–2 Chemical Reactor" (40 ml./liter) | 250 |

As can be seen from the above, the use of the hardener of the present invention effectively promotes a hardening of the gelatin-silver halide emulsion as evidenced by the abrasion resistance thereof, and is at least comparable in hardening power to conventionally employed glutaraldehyde, a known gelatin hardener.

EXAMPLE III

A hardener solution was prepared by diluting 2 grams of "X–2 Chemical Reactor" to 15 milliliters. This solution was added in varying amounts as indicated, to an 8% gelatin solution. The solution was then coated on transparent filmbase, dried and stored under ambient conditions for 25 hours. Melting points were taken in water.

| Ml. of hardener soln./100 g. 8% gelatin: | M.P. |
|---|---|
| None | 38° C. |
| 1 cc. | 66° C. |
| 2 cc. | 86° C. |
| 5 cc. | 90° C.+ |

As can be seen from the above, the direct addition of the water-soluble condensation product of acrolein and formaldehyde to a gelatin solution even when employed in very small amounts promotes a distinct hardening of the gelatin as evidenced by an increase in the melting point.

EXAMPLE IV

To 5 milliliters of the hardener solution prepared in Example III was added an excess of sodium bisulfite. The entire solution was then added to 100 grams of an 8% gelatin solution. This solution in turn was coated onto a transparent filmbase, dried and stored for 3 days under ambient conditions. The melting point of the coated film in water was found to be 48° C. A second strip was immersed in a developer solution for 2 minutes. The melting point measured immediately thereafter was found to be 90° C. Therefore, when used in the form of a bisulfite derivative the hardening solution is capable of exciting a delayed-action hardening effect.

While the present invention has been described primarily with respect to the foregoing specific examples, it is to be understood that the present invention is in no way to be deemed as limited thereto but must be construed as broadly as all or any equivalents thereof.

It is claimed:

1. A gelatin-silver halide photographic emulsion containing in an amount effective to harden the same, a hardener comprising a water soluble condensation product prepared by condensing acrolein and formaldehyde under alkaline conditions, said hardener corresponding to the general formula:

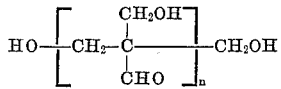

wherein $n$ is an integer from 1–5, inclusive.

2. The gelatin-silver halide photographic emulsion of claim 1 wherein said hardener is present as a bisulfite adduct of said water-soluble condensation product of acrolein and formaldehyde.

3. A photographic developer adapted for processing a gelatin-silver halide photographic emulsion comprising a silver halide developing agent and, in an amount sufficient to harden said emulsion, a hardener comprising a water soluble condensation product prepared by condensing acrolein and formaldehyde under alkaline conditions, said hardener corresponding to the general formula:

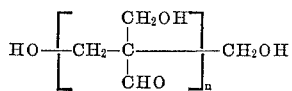

wherein $n$ is an integer from 1–5, inclusive.

4. The photographic developer of claim 3 wherein said hardener is present as a bisulfite adduct of said water-soluble condensation product of acrolein and formaldehyde.

References Cited

UNITED STATES PATENTS

| | | | |
|---|---|---|---|
| 3,080,281 | 5/1963 | Fischer et al. | 8—94.33X |
| 3,346,324 | 10/1967 | Fein et al. | 8—94.26 |

OTHER REFERENCES

Mason: "Photographic Processing Chemistry," Focal Press, Ltd. (1966), p. 152.

NORMAN G. TORCHIN, Primary Examiner

J. WINKELMAN, Assistant Examiner

U.S. Cl. X.R.

96—63